(12) United States Patent
Kai (10) Patent No.: US 9,781,330 B2
(45) Date of Patent: Oct. 3, 2017

(54) FOCUS DETECTION APPARATUS AND CONTROL METHOD FOR FOCUS DETECTION APPARATUS

(71) Applicant: CANON KABUSHIKI KAISHA, Tokyo (JP)

(72) Inventor: Hirohito Kai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/961,138

(22) Filed: Dec. 7, 2015

(65) Prior Publication Data

US 2016/0173758 A1    Jun. 16, 2016

(30) Foreign Application Priority Data

Dec. 10, 2014    (JP) ................................. 2014-249677

(51) Int. Cl.
*G02B 13/16*        (2006.01)
*H04N 5/225*       (2006.01)
*H04N 5/232*       (2006.01)

(52) U.S. Cl.
CPC ..... *H04N 5/23212* (2013.01); *H04N 5/23245* (2013.01)

(58) Field of Classification Search
CPC . H04N 5/23212; H04N 5/23245; H04N 5/232
USPC ................ 348/335, 340, 345, 348, 350, 352
See application file for complete search history.

(56) References Cited

U.S. PATENT DOCUMENTS

2012/0051731 A1*    3/2012    Hamada ................. G03B 17/14
                                                                                  396/124

FOREIGN PATENT DOCUMENTS

| JP | 2005-109621 A | 4/2005 |
| JP | 2005-227639 A | 8/2005 |

\* cited by examiner

*Primary Examiner* — Yogesh Aggarwal
(74) *Attorney, Agent, or Firm* — Canon USA Inc., IP Division (57) ABSTRACT

A focus detection apparatus includes a focus detection unit configured to detect a focus state in each of a plurality of focus detection regions, an acquisition unit configured to acquire an adjustment value used for adjustment of a detection result, for each of the focus detection regions, and a control unit configured to switch between a first mode and a second mode based on focus states detected in the focus detection regions. In the first mode, the acquisition unit acquires the adjustment values for the focus detection regions, based on a focus state in a specific first focus detection region. In the second mode, the acquisition unit acquires the adjustment value for each of the focus detection regions, based on a focus state detected in each of the focus detection regions.

14 Claims, 8 Drawing Sheets

FOCUS DETECTION APPARATUS AND CONTROL METHOD FOR FOCUS DETECTION APPARATUS

BACKGROUND OF THE INVENTION

Field of the Invention

The present invention generally relates to an imaging apparatus, and in particular it relates to a focus detection apparatus having a plurality of focus detection regions suitable for an imaging apparatus, such as a photographing camera.

Description of the Related Art

In many cases, a single-lens reflex (SLR) camera is equipped with a focus detection system employing a phase difference detection method. The phase difference detection method detects a focus state (a defocus amount) of a shooting optical system provided in an interchangeable lens, based on a phase difference between a pair of images formed by light passing through the shooting optical system. In the phase difference detection method, an in-focus position may not be accurately detected due to, for example, environmental influence during shooting, or influence of manufacturing errors of the single-lens reflex camera and the interchangeable lens.

To address such inaccuracies, Japanese Patent Application Laid-Open No. 2005-227639 discusses an imaging apparatus having a function of allowing a user to arbitrarily make a fine adjustment to an adjustment value of an automatic focusing (AF) function (i.e., AF microadjustment). However, according to the apparatus discussed in Japanese Patent Application Laid-Open No. 2005-227639, the user is required to manually repeat work for shooting and check to confirm whether a result of the fine adjustment made by the user is appropriate.

In connection the user's burden, a method for setting an adjustment value with simpler work has been discussed. Japanese Patent Application Laid-Open No. 2005-109621 discusses an imaging apparatus that captures images with different focus states (performs a focus bracket shooting), and calculates an AF correction amount (an adjustment value) based on a focus position displacement amount associated with an image selected by a user from the captured images.

In Japanese Patent Application Laid-Open No. 2005-109621, the captured image includes an error in a focus-state detection result (a distance measurement result) and an error in driving for a focus position shift amount, and thus the calculated AF correction amount may not be appropriate. In addition, in Japanese Patent Application Laid-Open No. 2005-109621, to set the AF correction amount for all distance measurement points (focus detection regions), it is necessary to calculate the AF correction amount by performing the focus bracket shooting for each of the distance measurement points. Therefore, as the number of distance measurement points increases, more work is necessary.

SUMMARY OF THE INVENTION

The present invention is directed to a focus detection apparatus and a control method for the focus detection apparatus, which are capable of making a highly accurate adjustment of a value of an AF function with simple operation, even if there is a plurality of focus detection regions to be used for adjustment of a focus detection result.

According to an aspect of the present invention, a focus detection apparatus includes a focus detection unit configured to detect a focus state in each of a plurality of focus detection regions, an acquisition unit configured to acquire an adjustment value used for adjustment of a detection result obtained by the focus detection unit, for each of the plurality of focus detection regions, and a control unit configured to switch between a first mode and a second mode based on focus states detected in the plurality of focus detection regions, wherein, in the first mode, the acquisition unit acquires the adjustment values for the plurality of focus detection regions, based on a focus state detected by the focus detection unit in a specific first focus detection region, and wherein, in the second mode, the acquisition unit acquires the adjustment value for each of the plurality of focus detection regions, based on a focus state detected by the focus detection unit in each of the plurality of focus detection regions.

Further features of the present invention will become apparent from the following description of exemplary embodiments with reference to the attached drawings.

DESCRIPTION OF THE EMBODIMENTS

An exemplary embodiment will be described below with reference to the drawings.

Figure 1:
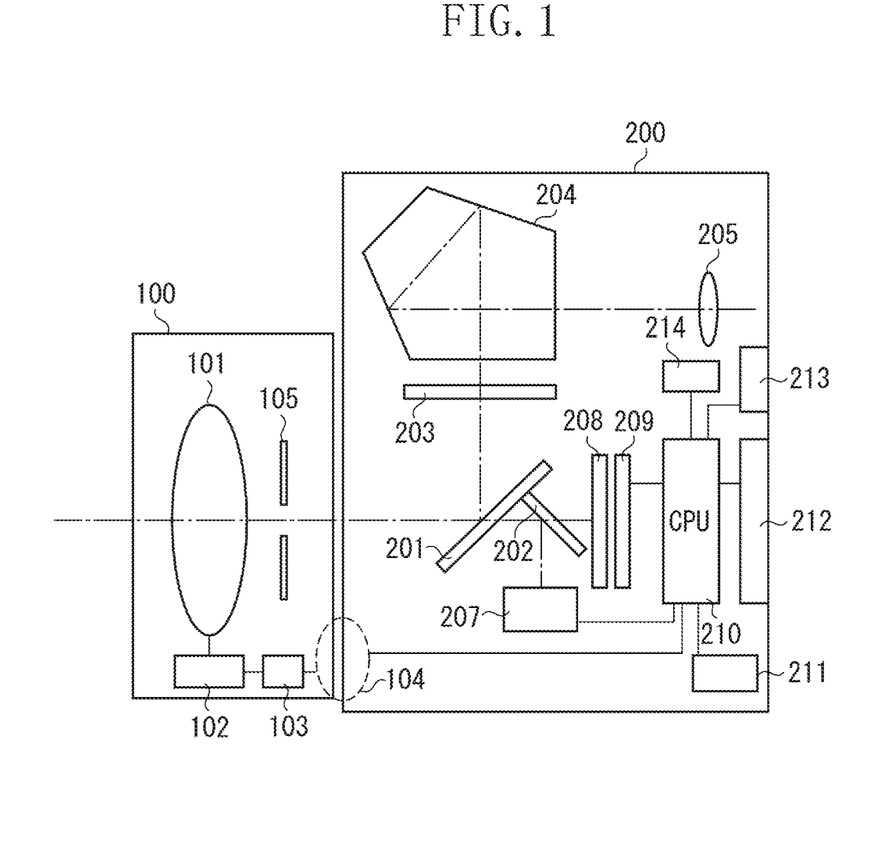
FIG. 1 is a diagram illustrating a schematic configuration of an imaging apparatus according to an exemplary embodiment.

FIG. 1 is a schematic diagram of an imaging apparatus including a focus detection apparatus according to the present exemplary embodiment. In FIG. 1, a lens unit 100 is detachably attached to a front face of a camera body 200. The camera body 200 and the lens unit 100 are electrically connected via mount contacts 104.

First, a configuration of the lens unit 100 will be described. A shooting lens 101 includes a focus lens for focus adjustment. In FIG. 1, the shooting lens 101 is illustrated as a single lens, but may be a group of lenses. Further, the shooting lens 101 may include a zoom lens for magnification and a fixed lens. An iris diaphragm 105 adjusts the quantity of light entering the camera body 200. The shooting lens 101 and the iris diaphragm 105 form a shooting optical system.

A lens control unit 103 performs data communication with the camera body 200 via the mount contacts 104, and controls the position of the shooting lens 101 by controlling a lens drive source 102 based on an instruction from the camera body 200. The lens drive source 102 is provided to move the shooting lens 101, and is configured using a stepping motor and associated circuitry, or like hardware and control logic.

Next, a configuration of the camera body 200 will be described. An imaging sensor 209 (an imaging unit) is configured using a charge coupled device (CCD) sensor, a complementary metal oxide semiconductor (CMOS) sensor, or the like. The imaging sensor 209 photoelectrically converts an object image formed by a light beam passing through the shooting optical system into an electrical signal, thereby outputting an image pickup signal. A shutter 208 regulates the quantity of light entering the imaging sensor 209.

A main mirror 201 has a semitransparent section. The main mirror 201 is retracted (moved) out of an optical path of an imaging light beam during shooting, and positioned obliquely in the imaging light beam (in the optical path) during focus detection. FIG. 1 illustrates a (mirror down) state where the main mirror 201 is inserted into the path of imaging light beam. Further, in a state of being obliquely positioned in the imaging light beam, the main mirror 201 guides a part of the light beam passing through the shooting optical system, to a finder optical system. The finder optical system includes a focusing screen 203, a pentaprism 204, and an eyepiece lens 205. In addition, the light beam reflected by the main mirror 201 enters a photometry unit (not shown), so that a luminance signal and a chrominance signal of an object optical image passing through the shooting optical system are detected.

A sub-mirror 202 is foldable and expandable with respect to the main mirror 201, in synchronization with movement of the main mirror 201. A part of the light beam passes through a semitransparent section of the main mirror 201, and then reflects off the sub-mirror 202 to go downward (in the figure). This part of the light beam then enters a focus detection unit 207 employing a phase difference system, so that a focus state of the focus lens is detected. The focus detection unit 207 includes a photoelectric conversion element (a pair of line sensors). A defocus amount is detected, based on a phase difference between image signals resulting from photoelectric conversion by the pair of line sensors that correspond to a focus detection region.

A system control unit 210 controlling the entire camera body 200 includes a central processing unit (CPU), and a random access memory (RAM) serving as a storage device. The system control unit 210 performs data communication with the lens control unit 103 via the mount contacts 104, thereby transmitting an instruction for driving the shooting lens 101 and receiving a status of driving the shooting lens 101.

A display unit 212 serves as a display, such as a liquid crystal display (LCD) or an OLED display, and displays shooting information and a captured image so that a user can confirm them. The system control unit 210 controls display by the display unit 212.

An operation unit 213 is connected to the system control unit 210, and includes operation members for operating the camera body 200, such as a power switch to power on/off the camera body 200, and a release button. When any of these operation members is operated, a signal is input into the system control unit 210 according to the pertinent operation. Connected to the release button or the operation unit 213 are a release switch SW1 to be turned on by a first stroke operation (half-pressing operation), and a release switch SW2 to be turned on by a second stroke operation (full-pressing operation), performed on the release button by the user.

A counter 214 is connected to the system control unit 210, and counts the number of shooting times when a focus bracket shooting is performed. The system control unit 210 resets the count value of the counter 214 when necessary.

A storage unit 211 such as an electrically erasable programmable ROM (EEPROM) stores identification (ID) information unique to the camera body 200. The storage unit 211 also stores adjustment values of parameters for shooting, which are obtained by adjustment using a reference lens (a shooting lens used in factory adjustment of the specific camera body). The system control unit 210 controls storage and reading processing for the storage unit 211 such as the EEPROM.

Meanwhile, the lens unit 100 includes a memory (not illustrated) for storing performance information of the lens unit 100 such as a focal length and a full aperture vale, and lens ID information that is unique information for identifying the lens unit 100. This lens memory also stores information received from the system control unit 210 by communication. The performance information and the lens ID information are transmitted from the lens control unit 103 to the system control unit 210, by initial communication when the lens unit 100 is attached to the camera body 200. The system control unit 210 stores these received pieces of information, into the storage unit 211.

Figure 2:
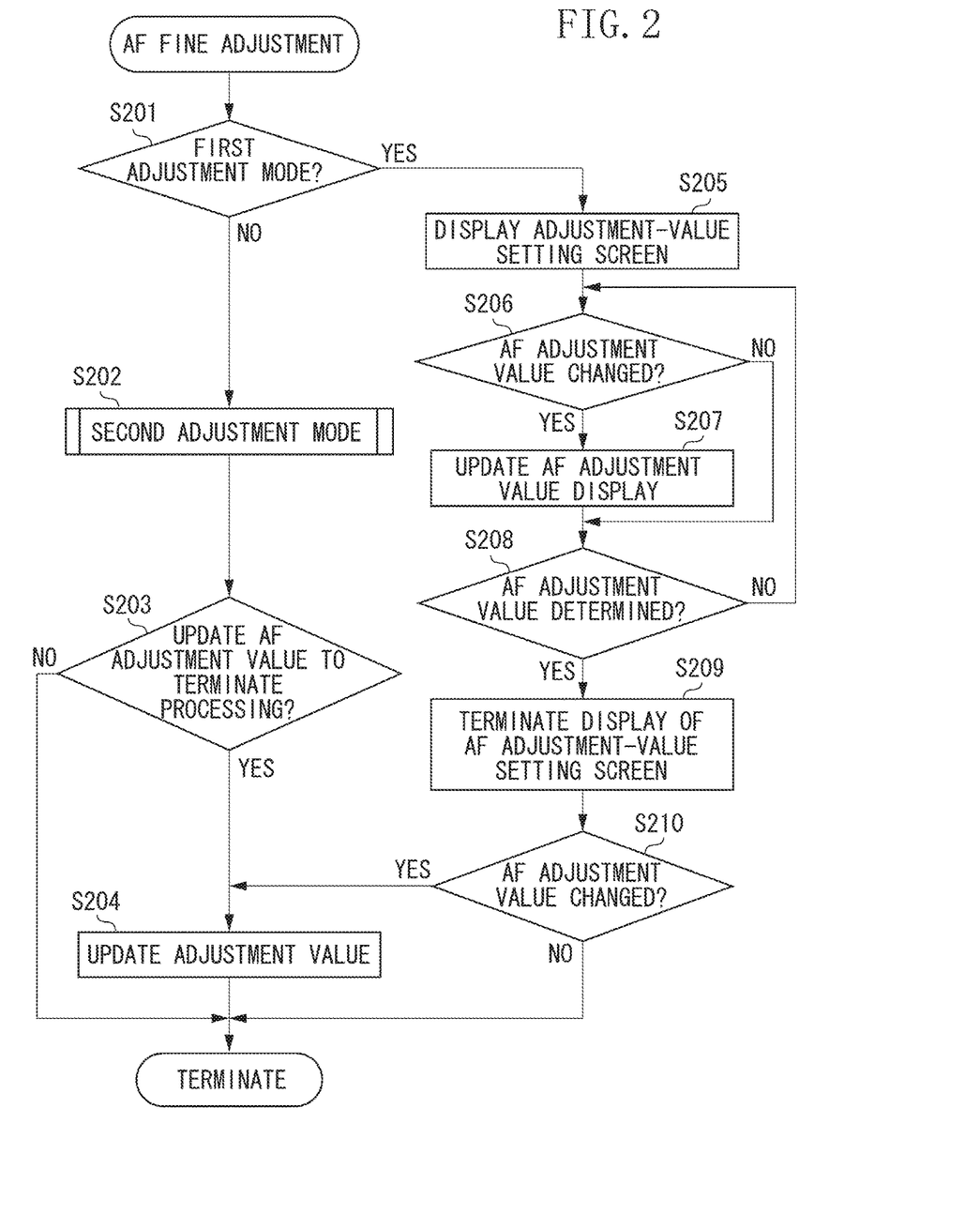
FIG. 2 is a flowchart illustrating automatic focusing (AF) fine adjustment processing according to the present exemplary embodiment.

FIG. 2 is a flowchart illustrating automatic focusing (AF) fine adjustment processing according to the present exemplary embodiment. In the present exemplary embodiment, the user can select either a first adjustment mode for performing AF microadjustment for arbitrarily setting an AF adjustment value, or a second adjustment mode for determining an AF adjustment value by using a micro adjustment support (MAS). The first adjustment mode and the second adjustment mode will be described in detail below. The present exemplary embodiment is also applicable to an imaging apparatus having only the second adjustment mode.

Figure 3:
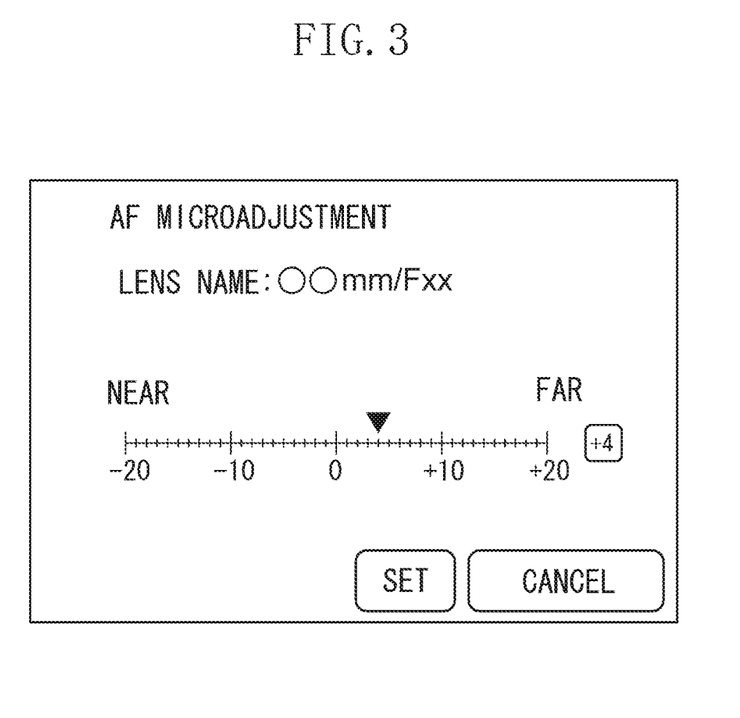
FIG. 3 is a diagram illustrating an example of an adjustment-value setting screen according to the present exemplary embodiment.

First, after the lens unit 100 and the camera body 200 are in an operational state (e.g., in an imaging state), in step S201, the system control unit 210 determines whether the first adjustment mode is selected. If the first adjustment mode is selected (Yes in step S201), the processing proceeds to step S205. If the second adjustment mode is selected (No in step S201), the processing proceeds to step 202. In step 205, the system control unit 210 controls the display unit 212 to display an adjustment-value setting screen for performing the AF microadjustment. FIG. 3 is a diagram illustrating an example of the adjustment-value setting screen.

The AF microadjustment is a process in which the user directly sets an AF adjustment value, by determining an amount and a direction of defocus between an in-focus position based on a defocus amount detected by the focus detection unit 207 and an actual in-focus position, based on an image taken by the user. As illustrated in FIG. 3, in the AF microadjustment according to the present exemplary embodiment, the user can arbitrarily set the AF adjustment value in steps of one scale unit within a range of a scale of ±20, so that the in-focus position based on the defocus amount can be shifted by the set AF adjustment value. In the present exemplary embodiment, a focus adjustment amount per scale unit of the AF adjustment value is a constant multiple of $F\delta$ (where F is an open F-number of the shooting lens, and δ is a permissible confusion circle diameter) representing a depth. In FIG. 3, "0" is a factory-set reference position of the imaging apparatus. In the adjustment-value setting screen illustrated in FIG. 3, a black triangle pointer indicates the AF adjustment value stored in the storage unit 211. The user can change the AF adjustment value, by performing an operation to move the black triangle pointer along the scale. When the adjustment-value setting screen is displayed, the processing proceeds to step S206.

In step S206, the system control unit 210 determines whether operation to change the AF adjustment value is performed by the user in the adjustment-value setting screen. If the operation to change the AF adjustment value is performed (Yes in step S206), the processing proceeds to step S207. If the operation to change the AF adjustment value is not performed (No in step S206), the processing proceeds to step S208.

In step S207, the system control unit 210 controls the display unit 212 to update the display of the adjustment-value setting screen, according to the operation of the user. Here, in the adjustment-value setting screen illustrated in FIG. 3, the black triangle pointer indicates a position corresponding to the operation of the user.

In step S208, the system control unit 210 determines whether the AF adjustment value is determined by the user. Here, the system control unit 210 determines whether a "SET" button is selected in the adjustment-value setting screen illustrated in FIG. 3. If the "SET" button is not selected (No in step S208), the processing returns to step S206 to repeat the process described above. On the other hand, if the "SET" button is selected (Yes in step S208), the processing proceeds to step S209 where the display of the adjustment-value setting screen is terminated, and then the processing proceeds to step S210.

In step S210, the system control unit 210 determines whether there is a difference between the AF adjustment value stored in the storage unit 211 when the first adjustment mode is selected, and the AF adjustment value newly set in steps S206 to S208. If there is a difference (Yes in step S210), the processing proceeds to step S204 to update the AF adjustment value. If there is no difference (No in step S210), the AF fine adjustment processing terminates.

Figure 4:
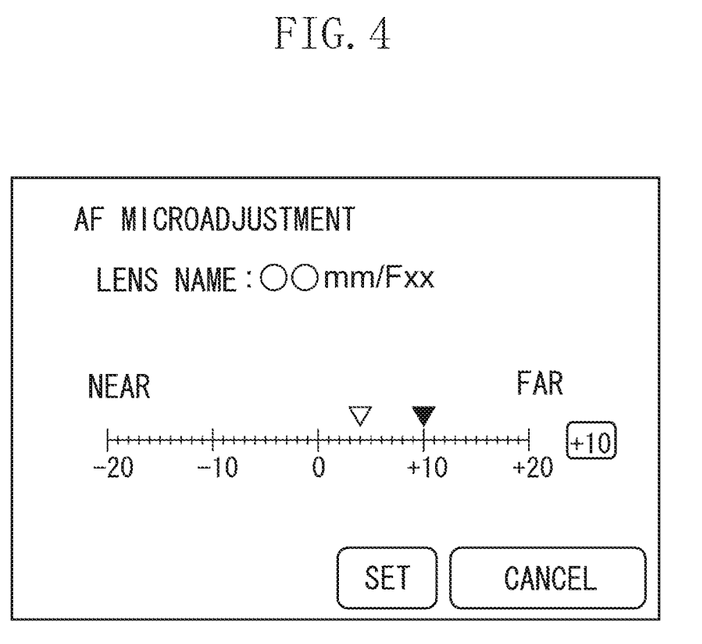
FIG. 4 is a diagram illustrating an example of a screen for displaying a stored AF adjustment value according to the present exemplary embodiment.

FIG. 4 is a diagram illustrating a screen for displaying the AF adjustment value stored in the storage unit 211. This scale is common to the first adjustment mode and the second adjustment mode. In the first adjustment mode, the user can change the AF adjustment value acquired in the second adjustment mode. In FIG. 4, a white triangle pointer indicates the AF adjustment value previously stored, whereas the black triangle pointer indicates the AF adjustment value to be stored newly. As for display in a case where the AF adjustment value can be set in each of a plurality of focus detection regions, it is conceivable that, for example, the user may be allowed to select a desired focus detection region, and an AF adjustment value corresponding to the selected focus detection region may be displayed. Displaying a screen as illustrated in FIG. 4 enables the user to confirm what AF adjustment value is stored.

On the other hand, if the second adjustment mode is selected in step S201 (No in step S201), then in step S202, an AF adjustment value is calculated in the second adjustment mode. In the second adjustment mode, while the focus lens is driven so that the position of the focus lens moves on a predetermined amount basis, a plurality of images are captured and defocus amounts are detected by the focus detection unit 207. Based on the defocus amount corresponding to an image selected by the user from among the captured images, the AF adjustment value is calculated. The processing performed in step S202 will be described in detail below. When the AF adjustment value is calculated, the processing proceeds to step S203.

In step S203, the system control unit 210 determines whether to update the AF adjustment value stored in the storage unit 211, to the AF adjustment value calculated in step S202. Here, for example, if the AF adjustment value is to be updated (Yes in step S203), specifically, for example, when setting of the calculated AF adjustment value is selected by predetermined operation, the processing proceeds to step S204. If the AF adjustment value is not to be updated (No in step S203), processing for setting the AF adjustment value terminates.

In step S204, the system control unit 210 updates the AF adjustment value by storing the AF adjustment value acquired in step S202 or acquired in steps S206 to step S210, into the storage unit 211. The processing for setting the AF adjustment value then terminates.

The AF adjustment value thus stored in the storage unit 211 is used for correction of the defocus amount that is detected by the focus detection unit 207 during actual shooting (during capturing of a recorded image) using the following expression (1).

Defocus amount to be used for AF control=detected defocus amount+adjustment value+AF adjustment value    (1)

In addition, in the above-described expression (1), "adjustment value" represents defocus-amount adjustment data in manufacturing. Based on "defocus amount to be used for AF control" corrected using the above-described expression (1), the system control unit 210 transmits an instruction for driving the focus lens, to the lens control unit 103. Here, when there is a plurality of focus detection regions, the focus detection region to be used for AF control may be a central focus detection region that is generally regarded as achieving high accuracy. Alternatively, the focus detection region to be used for AF control may be arbitrarily selected by the user, or may be automatically selected by the imaging apparatus depending on an object.

Figure 5:
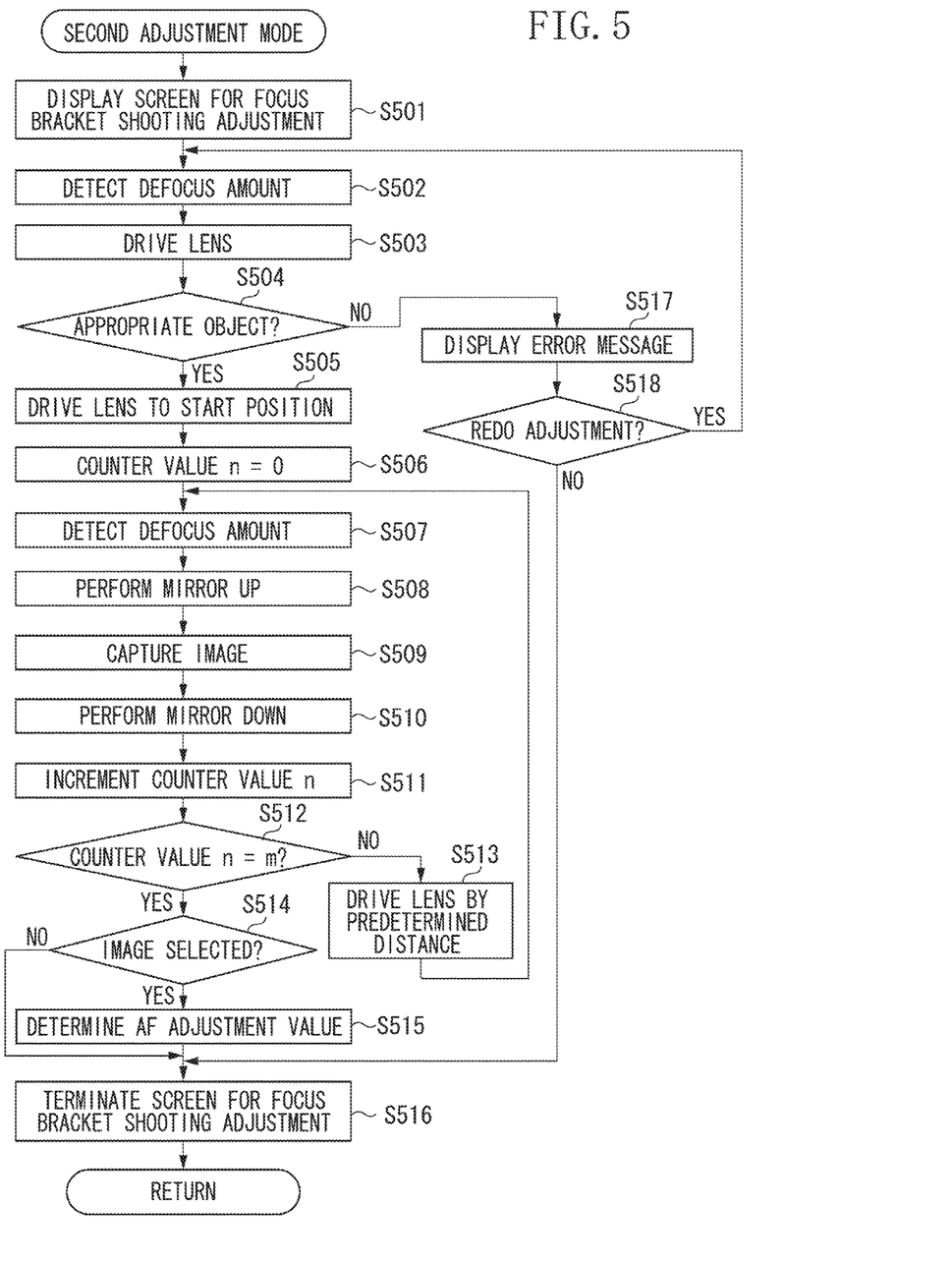
FIG. 5 is a flowchart illustrating processing in a second adjustment mode according to the present exemplary embodiment.

Next, the processing for setting the AF adjustment value in the second adjustment mode performed in step S202 will be described with reference to a flowchart of FIG. 5.

First, in step S501, the system control unit 210 controls the display unit 212 to display a screen for focus bracket shooting adjustment. Examples of information to be displayed include an operation instruction for the user. When the screen for focus bracket shooting adjustment is displayed, the processing proceeds to step S502.

In step S502, the focus detection unit 207 detects a defocus amount. The focus detection region targeted for the detection of the defocus amount may be a central focus detection region, a region arbitrarily selected by the user, or a region automatically selected by the imaging apparatus depending on an object. When the defocus amount is detected, the processing proceeds to step S503. In step S503, the system control unit 210 transmits an instruction for driving the focus lens based on the detected defocus amount, to the lens control unit 103. When driving of the focus lens to a lens position corresponding to the defocus amount is completed, the processing proceeds to step S504.

In step S504, the system control unit 210 determines whether the object used for the detection of the defocus amount in step S502 is appropriate for the calculation of the AF adjustment value. Here, for example, an AF reliability evaluation value is calculated based on an image signal (a signal generated by photoelectrically converting light received by the above-described pair of line sensors) used for the detection of the defocus amount. When an object is dark or when contrast is low, focus detection accuracy of the focus detection unit 207 may decrease. In such a case, i.e., when the focus detection accuracy decreases, the AF reliability evaluation value is calculated to be low. The system control unit 210 determines whether the object is an appropriate object, based on the calculated AF reliability evaluation value. If the object is an appropriate object (Yes in step S504), the processing proceeds to step S505. If the object is not an appropriate object (No in step S504), the processing proceeds to step S517.

The AF reliability evaluation value may be calculated from a plurality of viewpoints, so that a plurality of values (such as luminance of the object and contrast of the object, as described above) may be used. In this case, in step S504, the determination may be made based on whether all the AF reliability evaluation values are satisfied, or based on the value from a predetermined viewpoint.

If the object is not an appropriate object (No in step S504), then in step S517, the system control unit 210 controls the display unit 212 to display an error message. Conceivable examples of the content of the error message include information indicating the occurrence of an error, and information indicating a probable cause of an error. When display of the error message is completed, the processing proceeds to step S518, to receive an instruction for redoing or cancelling the adjustment by the user. If the adjustment is to be redone (Yes in step S518), the processing returns to step S502. If the adjustment is to be cancelled (No in step S518), the processing proceeds to step S516.

On the other hand, in step S505, the system control unit 210 transmits a driving instruction to the lens control unit 103 so that the focus lens moves to a focus bracket shooting start position. When a bracket interval for capturing each image is "s" and the number of captured images (a captured-image count) is "m", the focus bracket shooting start position is closer to a closest distance side by (m−1)×s/2, from the in-focus position detected in step S502.

In step S506, the system control unit 210 resets a counter value n of the counter 214. This counter value n is associated with the number of captured images of the focus bracket shooting, and is set to "0" before start of the focus bracket shooting. The processing then proceeds to step S507.

In step S507, the focus detection unit 207 detects a defocus amount. Here, the defocus amount is detected for each of focus detection regions for which the AF adjustment value is to be set. The defocus amount may be detected for a plurality of times in each of the focus detection regions, and an average value of the detected defocus amounts may be used as a detection result for each of the focus detection regions. The detected defocus amount is eventually stored in an internal memory, in association with an image to be captured in step S509. When detection of the defocus amount is completed, the processing proceeds to step S508.

In step S508, the system control unit 210 moves the main mirror 201 and the sub-mirror 202 to a position retracted from a photographic optical path (mirror up), prior to capturing of an image in step S509. Upon completion of the mirror up, the processing proceeds to step S509.

In step S509, the system control unit 210 causes capturing of an image by controlling the imaging sensor 209, and stores the captured image into the internal memory, in association with the defocus amount detected in step S507. When capturing of the image is completed, the processing proceeds to step S510. In step S510, the system control unit 210 moves the main mirror 201 and the sub-mirror 202 to a position within the photographic optical path (mirror down). Upon completion of the mirror down, the processing proceeds to step S511.

In step S511, the system control unit 210 increments the counter value n of the counter 214, and then the processing proceeds to step S512. In step S512, the system control unit 210 determines whether the counter value n has reached the captured-image count m. If the counter value n has reached the captured-image count m (Yes in step S512), the processing proceeds to step S514. If the counter value n has not reached the captured-image count m (No in step S512), the processing proceeds to step S513.

In step S513, the system control unit 210 transmits a driving instruction to the lens control unit 103, so that the focus lens is driven toward an infinite-far distance side by a drive amount corresponding to the bracket interval s described above. When driving of the focus lens is completed, the processing returns to step S507. By repeating the processes from step S507 to step S513, the m number of images varying in focus state by the bracket interval s are sequentially captured. In the above-described example, the focus bracket shooting is performed while the focus lens is driven toward the infinite-far distance side, after the focus lens is driven toward the closest distance side. However, the focus bracket shooting may be performed while the focus lens is driven toward the closest distance side, after the focus lens is driven toward the infinite-far distance side.

In step S514, the user selects an image in a desired focus from among the m number of images varying in focus state by the bracket interval s. In this process, the display unit 212 displays the images obtained by the focus bracket shooting. The images may be displayed one by one, or may be displayed in an array. Further, the displayed image may be an image subjected to image processing different from normal processing, to display the focus state clearly. For example, when a captured image is displayed, the image is normally subjected to edge enhancement processing to improve appearance of the image. However, for the image displayed in step S514, the edge enhancement processing is not performed. The user operates an operation member (not illustrated), while checking the images displayed by the display unit 212. The user then selects an image in a desired focus state, and determines the selected image.

Selection of an image is not necessarily required in step S514. In step S514, for example, when it is difficult to select an image, no image may be selected for a predetermined time, or the processing for setting the AF adjustment value may be canceled by predetermined operation. In such a case (No in step S514), the processing proceeds to step S516. On the other hand, when an image is selected (Yes in step S514), the processing proceeds to step S515.

In step S515, the system control unit 210 determines the AF adjustment value, based on the defocus amount associated with the image selected by the user in step S514. Processing for determining the AF adjustment value will be described in detail below. Upon determination of the AF adjustment value, the processing proceeds to step S516. In step S516, displaying the screen for the focus bracket shooting adjustment is terminated, which terminates the calculation of the AF adjustment value in the second adjustment mode.

The captured-image count m of the focus bracket shooting may be a value unique to the imaging apparatus or the lens unit 100, and may be set depending on the state of an object whenever necessary. In general, the higher the spatial frequency of an object is, the easier the determination of an in-focus state is. Therefore, the number of captured images may be reduced, or the bracket interval s may be decreased. This also holds true for a case where object information is edge information, and each parameter may be set depending on how easy it is to perform in-focus determination for an object. Each parameter for the focus bracket shooting may be arbitrarily set by the user.

Figure 6A:
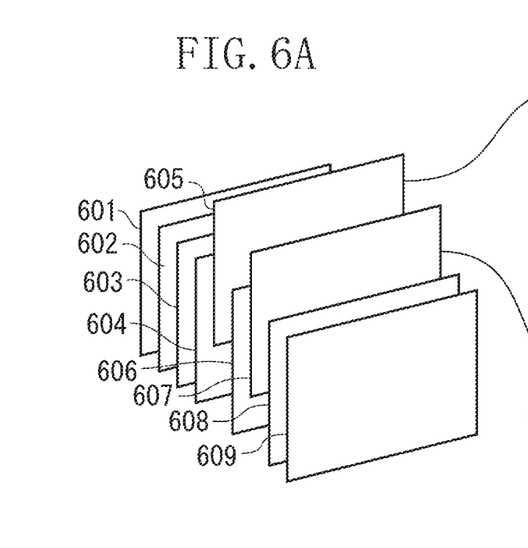
FIGS. 6A, 6B, and 6C are diagrams illustrating examples of a focus detection result obtained in the second adjustment mode according to the present exemplary embodiment.
Figure 6B:
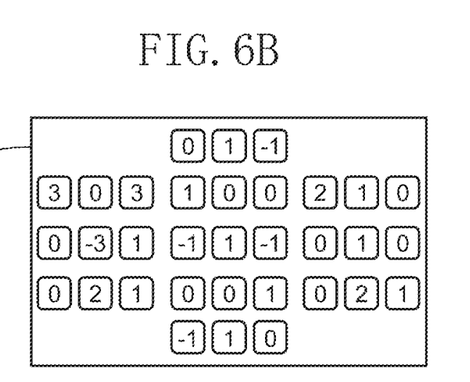
Figure 6C:
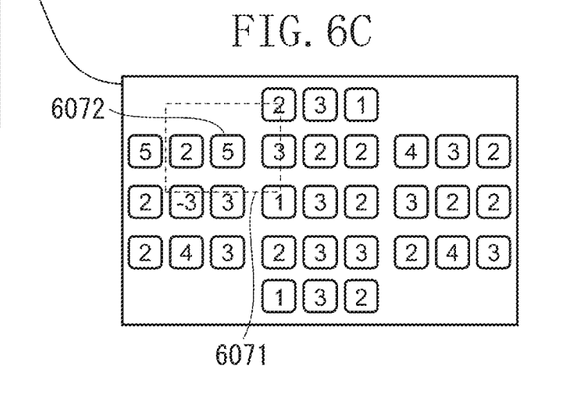

Next, a method for determining the AF adjustment value in the second adjustment mode of the present exemplary embodiment will be described using FIGS. 6A, 6B, and 6C to FIG. 8. FIGS. 6A, 6B, and 6C are diagrams illustrating the method for determining the AF adjustment value in the imaging apparatus of the present exemplary embodiment. FIG. 6A is a schematic diagram of the focus bracket shooting described above, and illustrates how images 601 to 609 are captured while a focus state is shifted. Assume that the captured-image count m in the bracket shooting is nine. In this case, by centering a position determined to be in focus based on a focus detection result obtained in step S502 described above, an image at this central position as well as preceding four images and following four images are captured at the bracket intervals s.

FIG. 6B illustrates each of the focus detection regions and a focus detection result thereof, in the image 605 at the center (a fifth image), in a group of the images 601 to 609 obtained in the focus bracket shooting. The lens position when the image 605 is captured corresponds to the lens position determined to be in focus based on the focus detection result obtained in step S502. The focus detection result illustrated here exemplifies a difference (in a unit system of the AF adjustment value) from the focus detection result obtained in step S502 described above. In general, even in the image 605 at the central position, the focus detection result of the focus detection region detected in step S507 may not be zero, due to a lens driving error or a focus detection error in the focus bracket shooting.

FIG. 6C illustrates each of the focus detection regions and a focus detection result thereof in the image 607 selected by the user, from the group of the images 601 to 609 obtained in the focus bracket shooting. Here, a region (an image region) 6071 surrounded with a broken line is used for determination in selecting the image by the user. For example, in a case where an enlarged image is displayed when operation for selecting an image is performed by the user, a region corresponding to this enlarged image can be determined to be the region 6071.

Figure 7A:
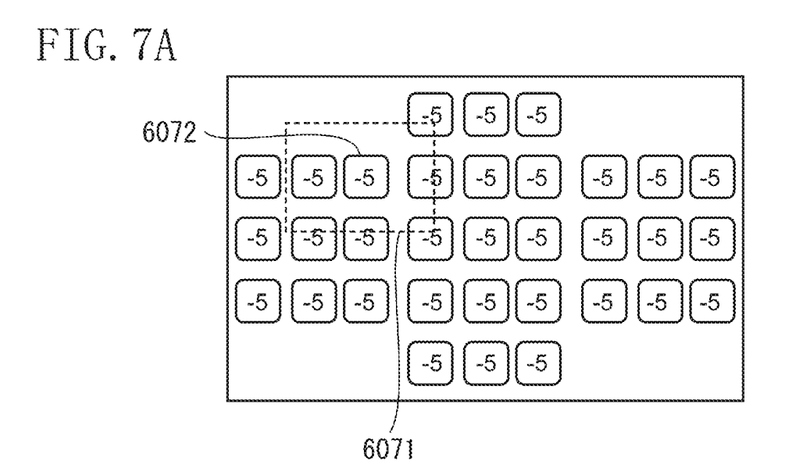
FIGS. 7A and 7B are diagrams each illustrating an example of an AF adjustment value determined in the second adjustment mode according to the present exemplary embodiment.
Figure 7B:
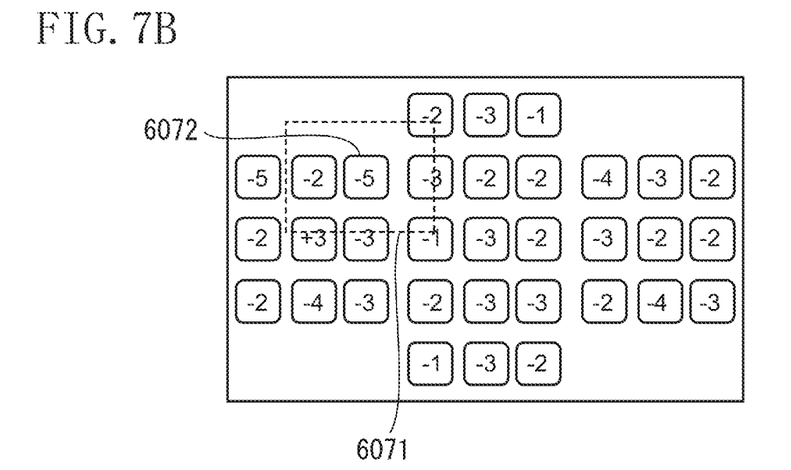

FIGS. 7A and 7B each illustrate an example of the AF adjustment value determined in the second adjustment mode of the present exemplary embodiment. The method for determining the AF adjustment value will be described below. FIG. 7A illustrates an example of the AF adjustment value determined in a first determination mode, and FIG. 7B illustrates an example of the AF adjustment value determined in a second determination mode. As illustrated in FIGS. 7A and 7B, the same AF adjustment value is set in all the focus detection regions in the first determination mode, whereas the AF adjustment value is calculated for each of the focus detection regions in the second determination mode.

Figure 8:
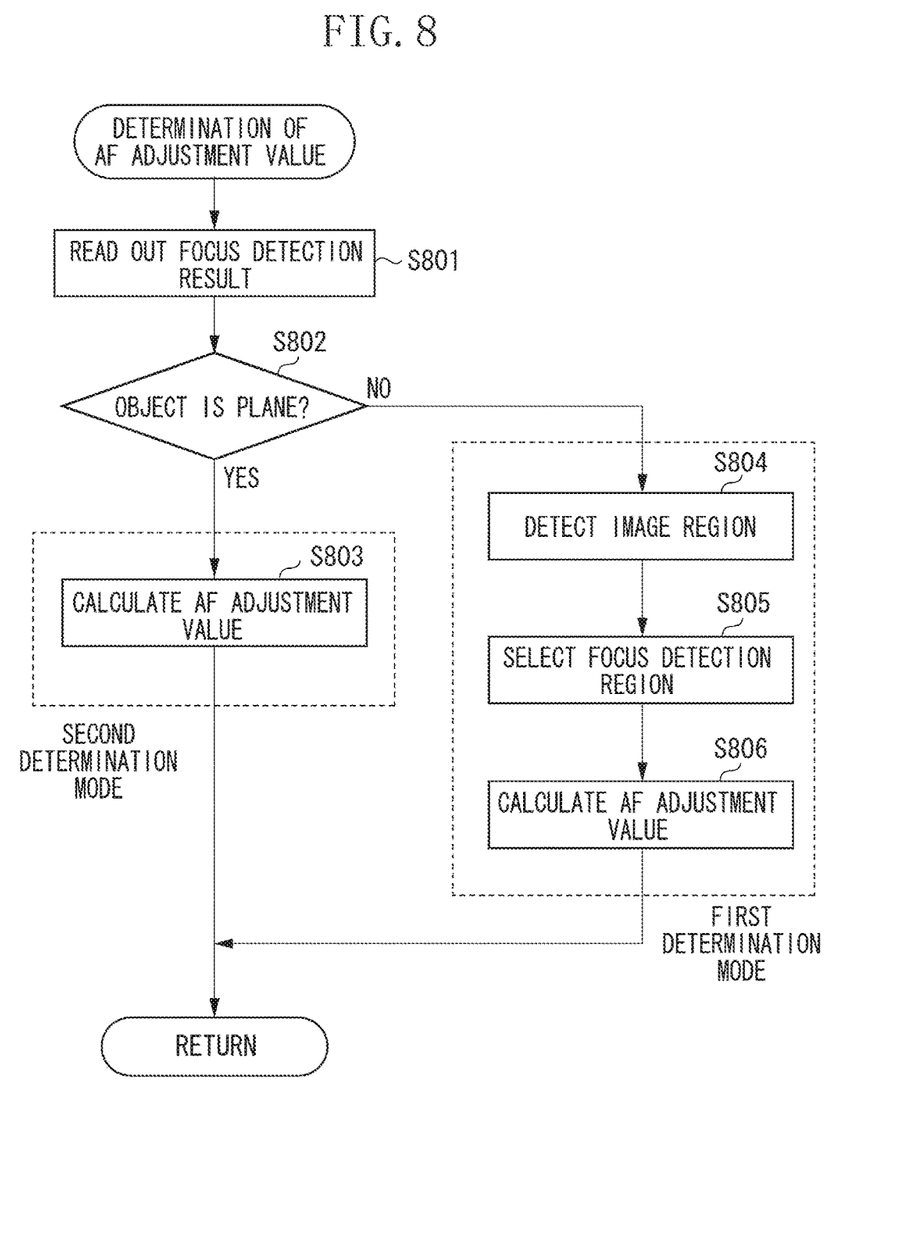
FIG. 8 is a flowchart illustrating processing for determining the AF adjustment value in the second adjustment mode according to the present exemplary embodiment.

FIG. 8 is a flowchart illustrating the method for determining the AF adjustment value according to the present exemplary embodiment. In the present exemplary embodiment, the AF adjustment value is determined for each of the focus detection regions, based on the focus detection result obtained in step S507. In the method for determining the AF adjustment value, the first determination mode and the second determination mode to be described below are provided, and the AF adjustment value is determined in either one of these modes, whichever is selected.

In step S801, the system control unit 210 reads out the focus detection result (the defocus amount) of each of the focus detection regions. The focus detection result is stored in association with the image (assumed to be the image 607 of FIG. 6C, here) selected in step S514 described above. When this readout of the focus detection result is completed, the processing proceeds to step S802.

In step S802, the system control unit 210 determines whether a photographic object is a plane, based on the focus detection result of each of the focus detection regions. Conceivable examples of a plane determination scheme include a scheme of determining that an object is detected by all the focus detection regions from the same distance, i.e., determining that the object is a plane, if the defocus amounts of all the focus detection regions in the selected image 607 are within a predetermined threshold width (within a threshold).

In the present exemplary embodiment, if the object is determined not to be a plane in step S802 (No in step S802), the first determination mode is adopted, whereas if the object is determined to be a plane in step S802 (Yes in step S802), the second determination mode is adopted. However, an operation when the object is determined not to be a plane is not limited to the present exemplary embodiment, and may be an operation of cancelling the second adjustment mode, or performing the bracket shooting again.

If the object is determined not to be a plane (No in step S802), the processing proceeds to steps S804 to S806 that are processes of the first determination mode. In step S804, the system control unit 210 detects the image region 6071 used by the user to determine the focus state, in the image 607 selected in step S514. Conceivable examples of an image-region detection scheme include a scheme of detecting, as the image region, a region observed when image selection operation is performed, e.g., a displayed enlarged region. Upon detection of the image region, the processing proceeds to step S805.

In step S805, the system control unit 210 selects a specific focus detection region, which is suitable for determination of the AF adjustment value, from all the focus detection regions. For this selection, it is conceivable to adopt, for example, a scheme of selecting a focus detection region 6072 closest to a central part of the image region 6071, based on the image region 6071 detected in step S804. Alternatively, a focus detection region that entirely or at least partially overlaps the image region 6071 may be displayed as a candidate for selection in a visually recognizable manner. The user may thereby select a focus detection region to be used for determination of the AF adjustment value. Upon selection of the specific focus detection region, the processing proceeds to step S806.

In step S806, the system control unit 210 calculates an AF adjustment value suitable for being uniformly applied to all the focus detection regions. The AF adjustment value is calculated by the following method, for example. The defocus amount, which is stored in association with the specific focus detection region 6072 selected in step S805, is converted into the unit system (1 scale unit of FIG. 4 is assumed to be 1 unit) of the AF adjustment value. The AF adjustment value is determined as an offset value that is a value equivalent to a negative number of the value resulting from the conversion, so that the value resulting from the conversion becomes zero. The determined AF adjustment value is adopted for all the focus detection regions.

The process in each of steps S802, S804, and S805 is described to be performed by the system control unit 210. However, a calculation element for performing each process may be independently provided.

On the other hand, if the object is determined to be a plane in step S802 (Yes in step S802), the processing proceeds to step S803 that is a process of the second determination mode. In step S803, based on the focus detection result stored in association with the image selected in step S514, the system control unit 210 determines AF adjustment values individually for all the focus detection regions. Here, the object is already determined to be a plane in step S802 and thus, it can be considered that the obtained focus detection result indicates that a desired focus state is achieved in all the focus detection regions. Therefore, for example, the AF adjustment value is calculated in such a way that, for each of all the focus detection regions, the defocus amount associated and stored is converted into the unit system (1 scale unit of FIG. 4 is assumed to be 1 unit) of the AF adjustment value. Subsequently, the AF adjustment value is determined as an offset value that is a value equivalent to a negative number of the value resulting from the conversion, so that the value resulting from the conversion becomes zero (so that the focus detection result after the adjustment becomes zero), in each of the focus detection regions.

If the AF adjustment value is determined to be updated in step S203 in FIG. 2 (Yes in step S203), then in step S204, the AF adjustment value determined in step S803 or S806 is stored into the storage unit 211.

In the present exemplary embodiment, the defocus amount detected in step S507 is stored in association with the captured image. However, the defocus amount may be stored in association with the captured image, after being converted into the unit system of the AF adjustment value. In this case, after a value is obtained by converting the defocus amount detected in each of the focus detection regions into the unit system of the AF adjustment value, determination is made as to whether the object is a plane in step S802, based on whether the obtained value is within a predetermined threshold width. Further, in step S803 or S806, a value, which is equivalent to a negative number of the value stored in association with a target focus detection region, is set as the AF adjustment value.

As described above, in the present exemplary embodiment, there are two modes for determining the AF adjustment value based on the focus detection result, when the AF adjustment value is set based on the focus detection result corresponding to the image selected by the user from among the images obtained in the focus bracket shooting. These are the first determination mode and the second determination mode. In the first determination mode, the AF adjustment value calculated based on the focus detection result in the specific focus detection region is also applied to the other focus detection regions. In the second determination mode, the AF adjustment value is calculated for each of the focus detection regions, based on the focus detection result. By using these modes, the AF adjustment value can be readily set in each of the focus detection regions by simple operation, even when the number of focus detection regions is large.

In addition, in the present exemplary embodiment, whether the object is a plane is determined based on the focus detection result of each of the focus detection regions, and switching between the first determination mode and the second determination mode is performed based on the result of this determination. When the object is a plane, it is more likely that the same object is detected in each of the focus detection regions. Therefore, a highly accurate AF adjustment value can be set for each of the focus detection regions, by calculating the AF adjustment value in the second determination mode. On the other hand, when the object is not a plane, the AF adjustment value is calculated in the specific focus detection region, which is determined in consideration of a region to which the user pays attention. Therefore, a highly accurate AF adjustment value can be set at least for a focus detection region where the user desires to obtain focus.

The preferable exemplary embodiment of the present invention is described above. However, the present invention is not limited to the above-described exemplary embodiment, and may be variously altered or modified within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249677, filed Dec. 10, 2014, which is hereby incorporated by reference herein in its entirety.

What is claimed is:

1. A focus detection apparatus comprising:
at least one processor or one circuitry which functions as
a focus detection unit configured to detect a focus state in each of a plurality of focus detection regions;
an acquisition unit configured to acquire an adjustment value used for adjustment of a detection result obtained by the focus detection unit, for each of the plurality of focus detection regions; and a control unit configured to perform switching between a first mode and a second mode based on focus states detected in the plurality of focus detection regions,
wherein, in the first mode, the acquisition unit acquires the adjustment values for a first focus detection region and the plurality of focus detection regions other than the first focus detection region, based on a focus state detected by the focus detection unit in the first focus detection region included in the plurality of focus detection regions, and
wherein, in the second mode, the acquisition unit acquires the adjustment value for each of the plurality of focus detection regions, based on a focus state detected by the focus detection unit in each of the plurality of focus detection regions.

2. The focus detection apparatus according to claim 1,
wherein the focus detection unit detects a defocus amount in each of the plurality of focus detection regions, and
wherein, in a case where each of defocus amounts in the plurality of focus detection regions is within a threshold, the control unit switches to the second mode and the acquisition unit acquires the adjustment value in the second mode.

3. The focus detection apparatus according to claim 2, wherein, in a case where at least one of the defocus amounts in the plurality of focus detection regions is beyond the threshold, the control unit switches to the first mode and the acquisition unit acquires the adjustment value in the first mode.

4. The focus detection apparatus according to claim 1, further comprising a determination unit configured to determine whether an object is a plane,
wherein the control unit is configured to switch between the first mode and the second mode based on a result of determination by the determination unit.

5. The focus detection apparatus according to claim 4,
wherein, in a case where an object is determined to be a plane by the determination unit, the control unit switches to the second mode and the acquisition unit acquires the adjustment value in the second mode, and
wherein, in a case where an object is determined not to be a plane by the determination unit, the control unit switches to the first mode and the acquisition unit acquires the adjustment value in the first mode.

6. The focus detection apparatus according to claim 1, wherein, in the second mode, the acquisition unit acquires the adjustment value in a manner such that focus states in the plurality of focus detection regions after adjustment become identical.

7. The focus detection apparatus according to claim 1, further comprising:
an imaging unit configured to capture an image; and
a lens control unit configured to control a position of a focus lens,
wherein the lens control unit performs control to move the focus lens to a plurality of different positions, and, at each of the positions, the imaging unit captures an image and the focus detection unit detects a focus state, and
wherein the acquisition unit acquires the adjustment value, based on a focus state corresponding to an image selected from captured images.

8. The focus detection apparatus according to claim 7, further comprising a region detection unit configured to detect an image region used for determination in selecting the image from the captured images,
wherein the first focus detection region is selected according to the image region detected by the region detection unit.

9. The focus detection apparatus according to claim 8, wherein the first focus detection region is selected from focus detection regions each being at least partially included in the image region detected by the region detection unit.

10. The focus detection apparatus according to claim 8, wherein a focus detection region closest to a center of the image region detected by the region detection unit is selected as the first focus detection region.

11. The focus detection apparatus according to claim 8, further comprising a display unit capable of enlarging and displaying a captured image,
wherein the region detection unit detects an enlarged image region displayed by the display unit, when the image is selected from the captured images.

12. A control method for a focus detection apparatus, the method comprising:
detecting a focus state in each of a plurality of focus detection regions;
acquiring an adjustment value used for adjustment of a detection result obtained by the detecting, for each of the plurality of focus detection regions;
controlling switching between a first mode and a second mode of the focus detection apparatus based on focus states detected in the plurality of focus detection regions,
wherein, in the first mode, the acquiring acquires the adjustment values for a first focus detection region and the plurality of focus detection regions except the first focus detection region, based on a focus state detected by the detecting in the first focus detection region included in the plurality of focus detection regions, and
wherein, in the second mode, the acquiring acquires the adjustment value for each of the plurality of focus detection regions, based on a focus state detected by the detecting in each of the plurality of focus detection regions.

13. The control method according to claim 12,
wherein the detecting a focus state includes detecting a defocus amount in each of the plurality of focus detection regions, and
wherein, in a case where each of defocus amounts in the plurality of focus detection regions is within a threshold, the controlling includes switching to the second mode and the acquiring includes acquiring the adjustment value in the second mode.

14. The control method according to claim 13, wherein, in a case where at least one of the defocus amounts in the plurality of focus detection regions is beyond the threshold, the controlling includes switching to the first mode and the acquiring includes acquiring the adjustment value in the first mode.

* * * * *